United States Patent [19]

Rader

[11] Patent Number: 5,432,207
[45] Date of Patent: Jul. 11, 1995

[54] PHENOLIC FOAM COMPOSITION AND USE THEREOF FOR "IN PLACE" FOAMING

[75] Inventor: Samuel L. Rader, Lewisburg, W. Va.

[73] Assignee: Jiffy Foam, Inc., Newport, R.I.

[21] Appl. No.: 328,694

[22] Filed: Oct. 25, 1994

[51] Int. Cl.$^6$ .......................... C08J 9/08; C08G 14/04
[52] U.S. Cl. ..................................... 521/128; 521/94; 521/158; 521/163; 521/164; 521/181
[58] Field of Search ............... 521/181, 158, 163, 164, 521/94, 128

[56] References Cited

U.S. PATENT DOCUMENTS 4,427,797  1/1984  Smith ................................... 521/166
4,579,876  4/1986  Illiopulos ............................ 521/164

*Primary Examiner*—Morton Foelak
*Attorney, Agent, or Firm*—Cushman Darby & Cushman

[57] ABSTRACT

A process for the manufacture of a foamed product in which a reactive phenolic resin is mixed with urea and an isocyanate, and this mixture is then mixed with an acid catalyst. The phenolic resin polymerizes, thereby liberating water and formaldehyde. The water reacts with the isocyanate to liberate carbon dioxide and the formaldehyde reacts with the urea. As the phenolic resin polymerizes, it traps the carbon dioxide in bubbles, thereby forming a foamed product.

5 Claims, No Drawings

PHENOLIC FOAM COMPOSITION AND USE THEREOF FOR "IN PLACE" FOAMING

The present invention relates to a composition for producing foamed shaped articles comprised of phenol-formaldehyde resin, using carbon dioxide as the blowing agent.

BACKGROUND OF THE INVENTION

"In place" foaming is a process in which two reactive components are brought together in a mixing head where they react. The resulting reaction mixture is then transferred to a mold where the mixture is foamed and cured into a solid resin. While this process is known for foams comprised of reactive systems such as polyurethane and polyisocyanurate resins, it has not hitherto been practical to apply it to foams comprised of phenol-formaldehyde resins.

A mixing head for use in carrying out "in place foaming" is described in Fiorentini, U.S. Pat. No. 4,332,335. The head comprises a mixing chamber which communicates with a discharge orifice and first and second ducts which dispense the reactive components into the mixing chamber. Means are provided for regulating the flow of the reactants to the reaction chamber.

Phenol-formaldehyde resins can be produced from partially-reacted phenol-formaldehyde resins known as "resols". Resols are resins which are made by reacting a phenol, normally phenol itself, with formaldehyde, using an excess of formaldehyde. The resulting low polymer or oligomer has reactive methylol groups which can react further to enlarge and cross-link the polymer into a cured, three-dimensional network. If the curing is carried out in the presence of a blowing agent, the product is a phenol-formaldehyde foam. It is known to use, e.g., chlorofluoro-carbons as blowing agents.

Typically, phenol and formaldehyde are reacted in the presence of a basic catalyst such as sodium hydroxide and triethyl amine, followed by neutralization and distilling off water. The initially produced resin is called an A-stage resin. It is known to add urea to this initial product. The A-stage resin can then be reacted further in the presence of an acid catalyst, during which time some formaldehyde and water are liberated. If urea is present, the formaldehyde may react with the urea to form bis methylol urea, which can also polymerize.

SUMMARY OF THE INVENTION

In accordance with the present invention, a reactive phenol-formaldehde oligomer, that is to say a resol or A-stage resin, is combined with urea, a catalyst and a reactive isocyanate. The urea and resol react to, inter alia, liberate water. The water in turn reacts with the reactive isocyanate, to generate carbon dioxide while the resol is curing. As a consequence, the concurrent polymerization and carbon dioxide-liberating reactions cause carbon dioxide to be entrapped as bubbles in the polymer, as it is cured, thereby producing a foam.

These reactions may be carried out by simply mixing the components, or in a mixing head. When a mixing head is used, preferably, one side of the mixing head is supplied with a liquid containing the resol, surfactants, urea, and the isocyanate component. The other side of the mixing head is supplied with a catalyst.

A wide variety of reactive phenol aldehyde resins may be used for the present invention. In general, they are the reaction products of a phenol, such as phenol itself and substituted phenols, for example alkyl-substituted phenols, such as cresols and nonyl phenol, paraphenyl phenol and resorcinol, alone or in mixtures of such phenols. The phenol is reacted with an aldehyde, preferably formaldehyde, although other aldehydes may be used such as acetaldehyde and furfurylaldehyde. The phenol and aldehyde are reacted in proportions such that there is an stoichometric excess of aldehyde to phenol, for example 1.75 to 2.25 mols of aldehyde for each mol of phenol. This reaction is normally carried out in the presence of a basic catalyst, for example sodium hydroxide or potassium hydroxide, and triethyl amine may also be present in combination with the hydroxide. Ordinarily, the phenol and base are charged into a reactor initially, and then formaldehyde is added. The mixture is heated to for example 70°–75° C. The heating is continued until a desired molecular weight is achieved, for example measured by cloud point. Oxalic acid may be added as a scavenger for the sodium or potassium chloride which may be formed during the reaction. When the desired molecular weight is achieved, the mixture is cooled and neutralized, following which water is distilled off to increase solids, for example to 78–82%. Then, the mixture is cooled to, e.g., 50° C. Urea is then added, but not reacted.

The above-described reaction results in the formation of a resin containing aliphatic alcohol groups, methylol groups in the case of formaldehyde. Useful resins are, for example characterized by viscosities of 3,000 cps to 20,000 and a molecular weight of 300 to 600.

The second constituent of the foam-forming reaction mixture is urea, which preferably is introduced into the resol in the manner described above. The amount used can vary from 4 to 20%, based on the weight of phenolic resin. As noted above, during further reaction, the urea reacts with formaldehyde.

The isocyanate constituent is an isocyanate which does not react with the other components until the reaction temperature is elevated, for example to 130° F. Thus, a blocked isocyanate may be used. Preferably, isocyanate is PAPI, i.e., a polyphenylenemethylenepolyisocyanate having the formula:

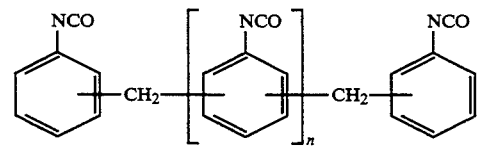

Several different products of this formula can be used, both CDI or MDI polymer varying in average molecular weight from 200 to 500, viscosities from 200 to 4,000 cps, functionalities from 2–4 and isocyanate equivalent wt. range from 78.5–150.

It is possible to slow down the reaction by using a blocked DCI or MDI isocyanate. However, as water is not liberated until the A-stage resin described above starts to polymerize in the presence of an acid catalyst, PAPI can be used in unblocked form.

The polymerization and foaming reaction may be carried out in the presence of a catalyst, for example an acid catalyst. Suitable catalysts include phenol sulfonic acid, toluene sulfonic acid, xylene sulfonic acid, sulfonic acid and phosphoric acid which may be used independently and in mixtures. The acid catalyst preferably is diluted with methanol. A particularly preferred catalyst is a mixture of toluene sulfonic acid and phenol sulfonic acid in a 30/70 blend. This mixture gives a better curing rate and the closed cell content of the foam was higher. In turn, this increased the flex modulus compression rating, and also shear resistance. This catalyst also gives a stronger, less friable foam, and this effect is believed to be caused by utilizing more of the water liberated in the reaction and converting it to carbon dioxide. Other catalysts were used in some cases because they reduced oxidation of metal molds. The amount of catalyst added may be 5 to 20% based on the weight of the reaction mixture.

In addition to the reactive constituents, it is desirable to include surface active agents which assist in the foaming action, i.e., in stabilizing the foam. There are many surfactants which can be used for this purpose, for example polysorbates which have an HLB greater than 11. Other fatty acids may be used such as those having the structure:

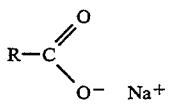

Other surfactants which can be used are the sodium dialkyl sulfosuccinates having the structure:

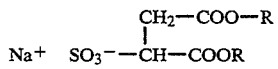

where R is an alkyl group.

Nonionic surfactants which can be used are N-alkyl phenyl polyoxyethylene ethers of the formula:

where R is an alkyl group.

Another useful group of surfactants are the dimethyl(polysiloxane) copolymers. There are a wide range of these products which can be used. Examples include General Electric co.'s SF1188, Union Carbide's L-5340 and Dow Corning's DC 193 and DC 201.

In accordance with a preferred embodiment of the invention, an anionic surfactant and a cationic surfactant are added. Surfactants which have been used successfully include polysorbate 40 polyoxyethylene 20 monopalmitate, acid no. 2.2, hydroxyl no. 89-105 and DC 193 dimethylpolysiloxane. A particularly useful mixture comprises DC 193 and SF 1188 in a 20/80 wt./wt. mixture.

The concentration of surfactant varies in accordance with the surfactant, but generally is in the range 0.3 to 4%. The evaluation of potential surfactants and the amount of surfactant is carried out in a manner similar to that in other foaming processes.

Fillers may also be added such as aluminum trihydrate which provides fire retardant properties, but it can be omitted if not needed for a particular application.

In addition, microspheres may be added, as is known for foamed products. Microspheres are added to provide higher insulation (R factor) properties.

A particularly important feature of the present invention is that teh foaming reaction reduces the level of residual formaldehyde in the product. This, a sample of the foamed product was found to have a residual formaldehyde level of 0.9 parts per billion. This value was determined by sampling air as it was released from the foam using a calibrated pump. The gaseous products from the foam were flushed into an impinger to collect the formaldehyde released over an eight-hour period. The resulting solution was then analyzed for formaldehyde using the chemistry of NIOSH Method 3500. While the reason for the reduced formaldehyde levels is not known, it is believed to arise from reaction between formaldehyde and primary amine formed when the polyisocyanate reacts with water, according to the reaction: $RNCO + H_2O \rightarrow RNH_2 + CO_2 \uparrow$.

The following formulation has been found to be particularly useful for a closed cell foam:
A. Phenolic Resin: 100 parts
B. Anionic surfactant: 1-3 parts
C. Ionic surfactant: 1-3 parts
D. PMDI resin: 0.5 to 1.5 parts
E. Catalyst 5 to 9 parts
F. Aluminum trihydrate: 10 parts
G. Microspheres 2 to 7 parts, if used.
pH is 5.5-6.0.

In a batch process, all of the components are added to a mixing vessel and combined. In a continuous process, the components are supplied to a mixing head, all of the components except the catalyst being supplied to one side of the head, and the catalyst being supplied to the other side. The foam emerging from the head is deposited on a continuous belt, moving at between 2 and 20 feet per minute.

The phenolic resin, A, is a phenol-formaldehyde A stage resin which contains 10.3% urea, based on the weight of phenol. It is obtained in the manner described above, using 1.75 to 2.25 moles formaldehyde for each mole of phenol and a basic catalyst (NaOH or KOH). The mixture of phenol and formaldehyde is reacted until a molecular weight of 350-400 is achieved, following which the mixture is neutralized with oxalic acid, which also scavenges leachable sodium or potassium chloride. After distillation, 4 to 14% urea is added, based on the weight of the phenol. Since the urea is present in the form of beads, heat is applied to dissolve it. The reactivity of the resin mixture is adjusted in relation to the density desired for the final product.

The surfactant used is a mixture of polysorbate 40 polyoxyethylene 20 sorbitan monopalmitate, acid no. 2.2, hydroxyl no. 89-104, sophinocation no. 41-52, HLB 15.6, and DC-193 dimethylpolysiloxane, Union Carbide 1-5340 of Union Carbide or SF-1188 of General Electric.

The isocyanate which is used is PAPI having an NCO content of 30.8, average molecular weight of 375, functionality of 3, isocyanate equivalent weight of 136.5

The catalyst is phenol sulfonic acid cut with methanol. Total acidity is 19.3, wt % phenol sulfonic acid is 66.8, specific gravity 1.3140, wt. % $H_2SO_4$ 0.58. Toluene sulfonic acid may also be used. Weight per cent of catalyst is 5-9%, based on the weight of the phenolic resin.

For an open cell foam, the phenolic resin should have a molecular weight of 300 to 600. The amount of urea is 4 to 14%, based on the phenolic resin. Surface active agents used include a first type to reduce surface tension between cells, such as dodecyl benzene sulfonic acid, sodium lauryl sulfate, acetyl trimethyl ammonium bromide and sodium sulfosuccinate. A mixture of these may be used. In addition, a surfactant is used for nucleation of the cell site, and to control cell size. Suitable materials are polyoxyethylene 20, sorbitan mono palmitate, dimethylpolysiloxanes L5340, Sl 1188, and DC 193. Mixtures of these may be used. Isocyanates which can be used are PAPI from Union Carbide and Mobay's Lupranite M205. The catalyst may be phenol sulphonic acid cut with methanol, total acidity 19.3 wt %, PSA 66.0, specific gravity 1.3140, Wt % $H_2SO_4$, 0.58. 4 to 14% catalyst is used.

The specifications for particularly useful urea-modified phenolic resins is illustrated in the following table:

| Resin | Reactivity[1] | Urea Content (%) |
|---|---|---|
| HRJ 11761 | 280–310° F. | 8.3 |
| HRJ 12667 | 180–210° F. | 10.3 |
| GP 541053 | 300–320° F. | 8.3 |
| GP | 200–220° F. | 7.3 |
| HRJ 4173h | 165–185° F. | |

[1]Peak exotherm temperature when resin and urea cured with catalyst but no isocyanate The following table illustrates the performance of samples of foam made from these resins:

| Resin | Reactivity | PAPI (Wt %) | Urea (Wt %) | Foam Density Pounds/ft² |
|---|---|---|---|---|
| HRJ 12667 | 180–220° F. | 1.5 | 10.3 | 12 |
| HRJ 11761 | 280° F. | 1.5 | 8.3 | 1.6 |
| GP | 305° F. | 1.5 | 8.3 | 1.4 |
| GP | 305° F. | 3 | 8.3 | 1 |
| HRJ 12667 | 180° F. | 1 | 10.3 | 20 |

The data gives an approximate range of the desnsities which can be achieved by the selection of the resin according to its reactivity. Fine tuning of density can be achieved by adjusting the proportion of PMDI. Examples of densities which have been achieved successfully are:

| Open Cell | | Closed Cell | |
|---|---|---|---|
| Sample | Density pounds/ft³ | Sample | Density pounds/ft³ |
| A | 0.8 | A | 1.0 |
| B | 1.0 | B | 2.0 |
| C | 1.5 | C | 2–28 |

DETAILED DESCRIPTION OF PREFERRED EMBODIMENTS

The invention is illustrated by the following examples, in which all parts are by weight unless indicated otherwise.

EXAMPLE 1

Resin HRJ 12667—500 grams
PMDI 2 grams
Tween 8 grams
Silicone surfactant—3 grams
Glycerine—5 grams
Catalyst (PSA/TSA[1])—50 grams
[1] toluene sulfonic acid/phenol sulfonic acid (30/70)

The first five components were mixed for 3 minutes, and then the catalyst was added, and mixed in for 1 minutes. The reaction mixture was then dumped into a mold. A foam density of 20 pounds per cubic foot was obtained.

EXAMPLE 2

An open cell foam was made from the following formulation:
Resin GP 541053 (Reactivity 305° F.)—275 grams
Resin HRJ 12667—25 grams
Tween 40—5 grams
SF 1188—1 gram
Dodecylbenzene sulfonic acid—5.5 grams
Sodium ether lauryl sulfate—5.5 grams
PMDI—5 grams
Phenol sulfonic acid—30grams The foam was relatively dense, and a larger amount of PMDI was tried to lighten it, in the following formulation:
Resin GP 541053—275 grams
Resin HRJ 12667—25 grams
Tween 40—6 grams
SF 1188—1 gram
Dodecylbenzene sulfonic acid—5.5 grams
Sodium ether lauryl sulfate—5.5 grams
PMDI—7 grams
Phenol sulfonic acid—30grams This led to a closed cell foam.

The last formulation was repeated, except that the amount of SF 1188 was increased to 3 grams.

EXAMPLE 3

An open cell foam was produced from the following formulation, the proportion of silicone being increased to reduce cell size:
Resin HRJ 11761—275 grams
Resin HRJ 12667—38.1 gram
Tween 40—6.4 grams
SF 1188/15340—4 grams/2 grams
Dodecylbenzene sulfonic acid—6 grams
Sodium ether lauryl sulfate—6 grams
Rhodaquat—6 grams
Sodium Sulfosuccinate—5.5 grams
PMDI—7 grams
Phenol sulfonic acid—36 grams

EXAMPLE 4

A foam was produced from the following formulation:
Resin HRJ 11761—400 grams
Resin HRJ 12667—200 grams
Tween 40—18 grams
DC 193—9 grams
SF 1188—6 grams
PMDI—22 grams
Phosphoric acid (85%)—75 grams

EXAMPLE 5

A foam was produced from the following formulation:
Resin HRJ 11761—400 grams
Resin HRJ 12667—200 grams
Tween 40—22 grams
DC 193—9 grams
SF 1188—6 grams
PMDI—22 grams
Phosphoric acid (85%)—75 grams The amount of Tween in this formulation was thought to be too high.

EXAMPLE 6

A foam was made from the following formulation:

Resin HRJ 11761—400 grams
Resin HRJ 12667—200 grams
Tween 40—18 grams
DC 193—9 grams
SF 1188—6 grams
PMDI—22 grams
Phosphoric acid (85%)—55 grams

EXAMPLE 7

A foam was made from the following formulation:
Resin HRJ 11761—400 grams
Resin HRJ 12667—200 grams
Tween 40—18 grams
DC 193—9 grams
SF 1188—6 grams
PMDI—22 grams
Phosphoric acid (85%)—85 grams

EXAMPLE 8

A foam was made from the following formulation:
Resin GP 541053—500 grams
Resin HRJ 12667—100 grams
Tween 40—12 grams
Silicone 407-2178—26 grams
Dodecylbenzene sulfonic acid—12 grams
Sodium ether lauryl sulfate—16 grams
Sodium sulfosuccinate—12 grams
PMDI—9 grams
Phenyl sulfonic acid—72 grams

EXAMPLE 8

A foam was prepared from the following formulation:
Resin GP 541053—500 grams
Resin HRJ 12667—100 grams
Tween 40—12 grams
Silicone 407-2178—26 grams
Dodecylbenzene sulfonic acid—12.5 grams
Sodium ether lauryl sulfate—16 grams
Sodium sulfosuccinate—12 grams
PMDI—9 grams
Phenyl sulfonic acid—72 grams

What is claimed is:

1. A process for the manufacture of a foamed product which comprises reacting a reactive phenolic resin, urea and an isocyanate to concurrently polymerize said phenolic resin, whereby water is formed and generates carbon dioxide by reaction of the water with said isocyanate.

2. A process as set forth in claim 1 in which the reactive phenolic resin is made from a reaction mixture containing phenol and formaldehyde, in proportions of about 1.75 to 2.25 moles formaldehyde for each mole of phenol.

3. A process as set forth in claim 1 in which the isocyanate is polyphenylenemethylenepolyisocyanate, 4. A process as set forth in claim 1 in which the reaction is carried out in the presence of an acid catalyst.

5. A process as set forth in claim 4 in which the phenolic resin, the urea and the isocyanate are premixed, and the resulting mixture is then mixed with the catalyst.

* * * * *